UNITED STATES PATENT OFFICE.

RICHARD HERZ, OF FRANKFORT-ON-THE-MAIN, GERMANY, ASSIGNOR TO LEOPOLD CASSELLA & CO., OF FRANKFORT-ON-THE-MAIN, GERMANY.

BLUE SULFUR DYE AND PROCESS OF MAKING SAME.

SPECIFICATION forming part of Letters Patent No. 709,151, dated September 16, 1902.

Application filed February 3, 1902. Serial No. 92,430. (No specimens.)

*To all whom it may concern:*

Be it known that I, RICHARD HERZ, a citizen of Prussia, and a resident of Frankfort-on-the-Main, in the Province of Hesse-Nassau and Kingdom of Prussia, Germany, have invented certain new and useful Improvements in Blue Sulfur Dyes and Processes of Making Same, of which the following is a specification.

Whereas para amido para oxydiphenylamin can only be produced with difficulty on a commercial scale, I have made the discovery that the hitherto-unknown para amidotolyl para oxyphenylamin of the constitution

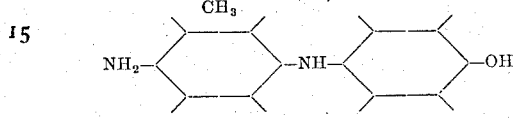

may be obtained quite easily and almost quantitatively by reducing the product of simultaneous oxidation of para amidophenol and ortho toluidin. I have further discovered that whereas the direct-dyeing blue sulfur colors which have been produced from para amido para oxydiphenylamin cannot at present be used for dyeing purposes on account of their insufficient affinity to the fiber the coloring-matters obtained by heating the new compounds already mentioned with polysulfids show an excellent affinity to the fiber and are much faster than the products obtained from amidoöxydiphenylamin.

The method of producing the amidotolyloxyphenylamin is illustrated by the following example: Eleven kilos para amidophenol and 10.7 kilos ortho toluidin are dissolved in two hundred liters water and thirty-one kilos sulfuric acid, (66° Baumé.) The solution is well cooled with ice and quickly mixed with a solution of twenty kilos bichromate of soda and two hundred liters water. A concentrated solution of seventy-five kilos sodium sulfid is at once added and the whole heated by means of direct steam to from 85° to 90° centigrade. The para amidotolyl para oxyphenylamin goes into solution, whereas the chromium hydrate remains undissolved. The hot solution is filtered and the base separated from the cooled filtrate by the addition of bicarbonate of soda. The separation may be completed by saturation with common salt. In order to purify the product thus obtained, it is dissolved in dilute hydrochloric acid and precipitated from the filtered solution by the addition of carbonate of soda. The base thus obtained is easily soluble in water in presence of mineral acids or alkalies and in alcohol, but somewhat more difficultly in benzene, crystallizing out from this latter solvent in the shape of grayish-white needles, melting at 160° centigrade.

The method of producing a blue sulfur dyestuff from the amidotolyloxyphenylamin is illustrated by the following example: Forty-eight kilos crystallized sodium sulfid are melted in an iron vessel connected with a reflux-condenser. Then nineteen kilos sulfur and eleven kilos para amidotolyl para oxyphenylamin are added, successively, while the temperature is about 80° centigrade. The temperature is then raised to 120° centigrade and maintained at that point for about twenty hours. The leuco compound of the dyestuff is dissolved in the melt, from the solution of which the dyestuff itself may be separated by introducing a current of air. The dyestuff is easily soluble in water in presence of sodium sulfid with a reddish-purple color and dyes direct indigo-blue shades on unmordanted cotton. By modifying the conditions of melting the shade of the coloring-matters may be varied. At higher temperatures dyestuffs of a more greenish and duller shade are obtained, while at lower temperatures or if working in an alcoholic solution more reddish and brighter shades. The general properties of the dyestuffs, however, remain essentially the same.

Having thus described my invention and in what manner the same can be performed, what I claim is—

1. The process of producing blue cotton dyestuffs by heating para amidotolyl para oxyphenylamin with polysulfids substantially as described.

2. As a new article of manufacture the blue coloring-matter resulting from the reaction of polysulfids on para amidotolyl para oxyphenylamin which is a dark-blue powder hardly soluble in pure water but easily soluble in the presence of caustic alkalies or sulfids with a reddish-purple color, soluble in concentrated sulfuric acid with a dark-blue color and which dyes unmordanted cotton in a bath containing alkaline sulfids blue shades fast to acids, milling and light substantially as described.

Signed at Frankfort-on-the-Main, in the Province of Hesse-Nassau and Kingdom of Prussia, this 17th day January, A. D. 1902.

RICHARD HERZ.

Witnesses:
JEAN GRUND,
CARL GRUND.